US012695554B2

(12) United States Patent
Nhan et al.

(10) Patent No.: US 12,695,554 B2
(45) Date of Patent: Jul. 28, 2026

(54) DEVICES AND METHODS FOR ACKNOWLEDGING SWITCHING OF OPERATION MODES FOR A CLIENT DEVICE

(71) Applicant: Nokia Technologies Oy, Espoo (FI)

(72) Inventors: Nhat-Quang Nhan, Massy (FR); Kari Juhani Hooli, Oulu (FI); Oskari Tervo, Oulu (FI); Amir Mehdi Ahmadian Tehrani, Munich (DE); Marco Maso, Massy (FR); Karri Markus Ranta-Aho, Espoo (FI); Alessio Marcone, Munich (DE)

(73) Assignee: Nokia Technologies Oy, Espoo (FI)

( * ) Notice: Subject to any disclaimer, the term of this patent is extended or adjusted under 35 U.S.C. 154(b) by 430 days.

(21) Appl. No.: 18/356,781

(22) Filed: Jul. 21, 2023

(65) Prior Publication Data

US 2024/0113816 A1     Apr. 4, 2024

(30) Foreign Application Priority Data

Sep. 30, 2022     (FI) ..................................... 20225873

(51) Int. Cl.
H04L 1/1867 (2023.01)
H04W 72/04 (2023.01)
(Continued)

(52) U.S. Cl.
CPC ........... H04L 1/1887 (2013.01); H04W 72/04 (2013.01); H04W 72/1268 (2013.01); H04W 72/21 (2023.01); *H04W 88/06* (2013.01)

(58) Field of Classification Search
CPC . H04W 72/04; H04W 72/1268; H04W 72/21; H04W 88/06; H04L 5/0053;
(Continued)

(56) References Cited

U.S. PATENT DOCUMENTS

2018/0035423 A1     2/2018  Wang et al.
2020/0068539 A1     2/2020  Liu et al.
(Continued)

FOREIGN PATENT DOCUMENTS

CN     113572587 A     10/2021
EP     3603231 A1     2/2020
(Continued)

OTHER PUBLICATIONS

Extended European Search Report received for corresponding European Patent Application No. 23187414.0, dated Mar. 15, 2024, 11 pages.

(Continued)

*Primary Examiner* — Brian D Nguyen
(74) *Attorney, Agent, or Firm* — Rimon PC; Robert P. Michal, Esq.

(57)     ABSTRACT

Example embodiments provide a method for acknowledging switching of operation modes for a client device. The method comprises receiving, by a client device, a first indication comprising at least one of a first time duration, a period for repeating the first time duration or an indication of a list of at least two operation modes for the client device. The client device may be configured to receive a second indication comprising instructions for the dynamic switching of operation modes based on the list of at least two operation modes. The client device may be further configured to indicate the selected operation mode to a network device. Devices, methods, and computer programs are disclosed.

15 Claims, 5 Drawing Sheets

(51) Int. Cl.
    *H04W 72/1268*        (2023.01)
    *H04W 72/21*          (2023.01)
    *H04W 88/06*          (2009.01)

(58) Field of Classification Search
    CPC ....... H04L 1/16; H04L 1/1887; H04L 1/0016;
                        H04L 1/0023; H04L 5/0094
    See application file for complete search history.

(56) References Cited

U.S. PATENT DOCUMENTS

| | | | | |
|---|---|---|---|---|
| 2022/0060288 | A1* | 2/2022 | Sun | H04W 72/23 |
| 2022/0123856 | A1 | 4/2022 | Levitsky et al. | |
| 2024/0040504 | A1* | 2/2024 | Abotabl | H04W 52/0235 |
| 2024/0073800 | A1* | 2/2024 | Abotabl | H04W 48/18 |
| 2024/0178945 | A1* | 5/2024 | Xiong | H04L 1/1854 |
| 2025/0062864 | A1* | 2/2025 | Wang | H04L 5/0055 |
| 2025/0310953 | A1* | 10/2025 | Choi | H04L 5/001 |

FOREIGN PATENT DOCUMENTS

| | | | | |
|---|---|---|---|---|
| EP | 3776999 | B1 * | 1/2022 | H04W 72/21 |
| WO | 2022/198165 | A1 | 9/2022 | |

OTHER PUBLICATIONS

"Indication signalling for uplink waveform", 3GPP TSG-RAN WG2 #99, R2-1709578, Agenda item: 10.2.15, Samsung, Aug. 21-25, 2017, 3 pages.

"3rd Generation Partnership Project; Technical Specification Group Radio Access Network; NR; Physical layer procedures for data (Release 17)", 3GPP TS 38.214, V17.2.0, Jun. 2022, pp. 1-228.
"Discussion on approaches and solutions for NR PUSCH coverage enhancement", 3GPP TSG RAN WG1 #103, R1-2008703, Agenda: 8.8.2.1, Nokia, Oct. 26-Nov. 13, 2020, 15 pages.
"Potential coverage enhancement techniques for PUSCH", 3GPP TSG-RAN WG1 Meeting #103e, R1-2008626, Agenda: 8.8.2.1, Qualcomm Incorporated, Oct. 26-Nov. 13, 2020, 13 pages.
"3rd Generation Partnership Project; Technical Specification Group Radio Access Network; NR; Physical layer procedures for control (Release 17)", 3GPP TS 38.213, V17.2.0, Jun. 2022, pp. 1-256.
"New WI: Further NR coverage enhancements", 3GPP TSG RAN Meeting #94e, RP-213579, Agenda: 8.6.1, China Telecom, Dec. 6-17, 2021, 5 pages.
"Summary on Rel-17 TEIs", 3GPP TSG RAN WG1 #106bis-e, R1-2109722, Agenda: 8.18, NTT Docomo Inc, Oct. 11-19, 2021, pp. 1-101.
Finnish Application No. 20225780, "Client Device Operation Mode Indication, and related Devices, Methods and Computer Programs", filed on Sep. 8, 2022, pp. 1-37.
"IEEE 802.11", Wikipedia, Retrieved on Jul. 4, 2023, Webpage available at : https://en.wikipedia.org/wiki/IEEE_802.11.
Office action received for corresponding Finnish Patent Application No. 20225873, dated Mar. 21, 2023, 12 pages.
Guan et al., "5G field trials: OFDM-based waveforms and mixed numerologies", IEEE Journal on Selected Areas in Communications, vol. 35, No. 6, Jun. 2017, pp. 1234-1243.

* cited by examiner

100

102

104

200

204

206

Canceled due to overlapping with HP CG-PUSCH

DG-PUSCH (LP)

CG-PUSCH (HP)

CG-PUSCH

DCI

202

Waveform of subsequent CG-PUSCH is unclear to gNB, i.e., unclear whether DG-PUSCH was canceled due to overlapping or missing DCI

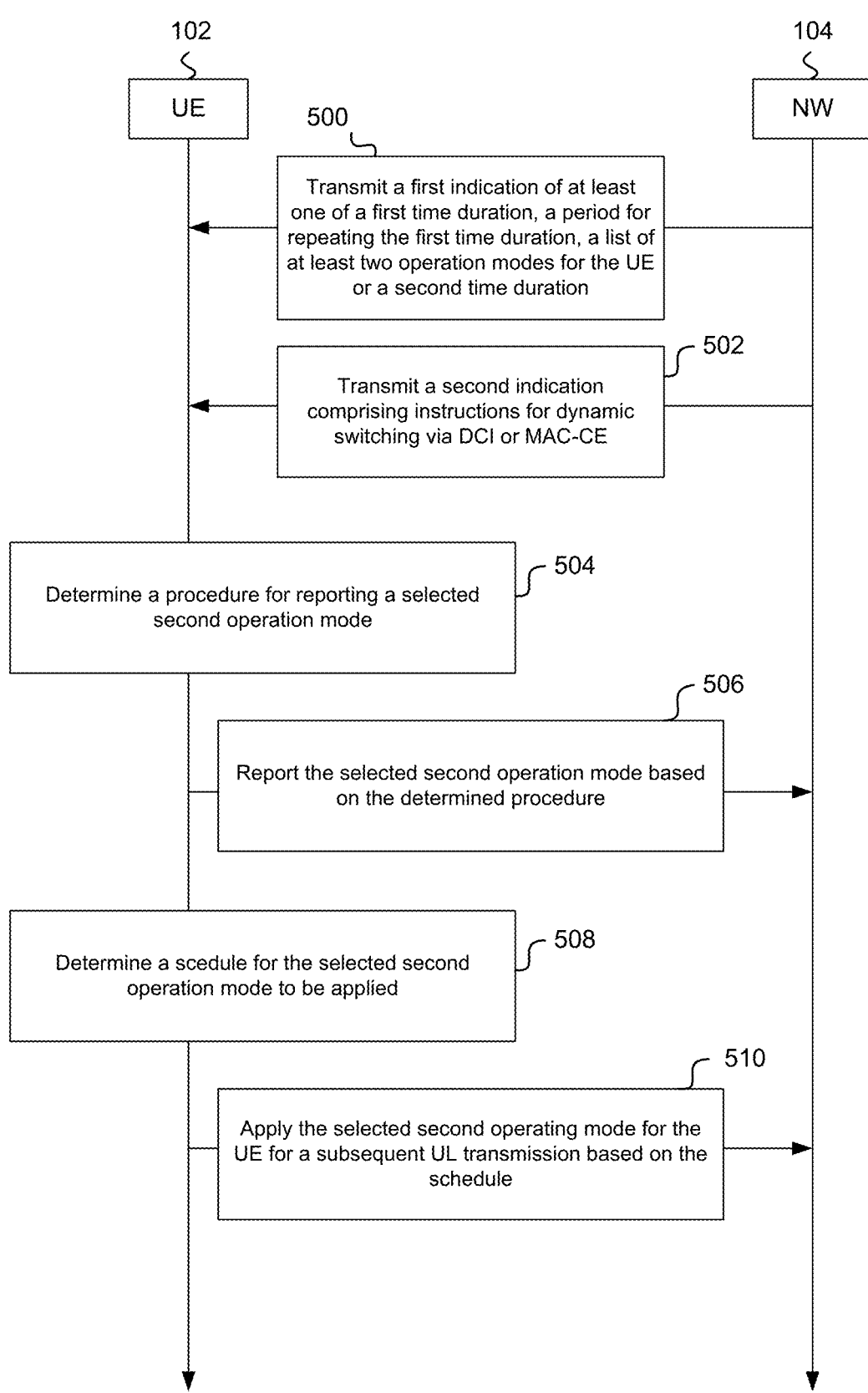

102

UE

104

NW

500

Transmit a first indication of at least one of a first time duration, a period for repeating the first time duration, a list of at least two operation modes for the UE or a second time duration

502

Transmit a second indication comprising instructions for dynamic switching via DCI or MAC-CE

504

Determine a procedure for reporting a selected second operation mode

506

Report the selected second operation mode based on the determined procedure

508

Determine a scedule for the selected second operation mode to be applied

510

Apply the selected second operating mode for the UE for a subsequent UL transmission based on the schedule

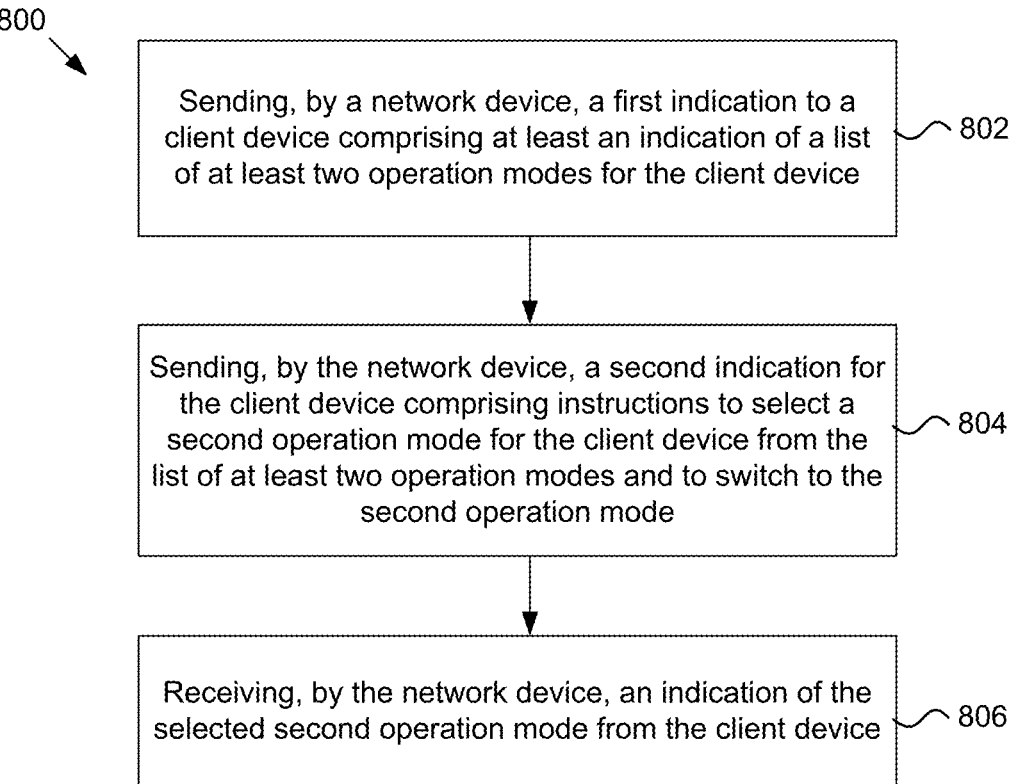

Sending, by a network device, a first indication to a client device comprising at least an indication of a list of at least two operation modes for the client device    802

Sending, by the network device, a second indication for the client device comprising instructions to select a second operation mode for the client device from the list of at least two operation modes and to switch to the second operation mode    804

Receiving, by the network device, an indication of the selected second operation mode from the client device    806

FIG. 8

DEVICES AND METHODS FOR ACKNOWLEDGING SWITCHING OF OPERATION MODES FOR A CLIENT DEVICE

RELATED APPLICATION

This application claims priority to, and the benefit of, Finnish Application No. 20225873, filed on Sep. 30, 2022, the contents of which is incorporated herein by reference in its entirety.

TECHNICAL FIELD

The present application generally relates to information technology. In particular, some example embodiments of the present application relate to acknowledging switching of operation modes of a client device, and to related devices and methods.

BACKGROUND

In 5G NR networks, modulated symbols and/or reference signals may be converted to an uplink baseband signal waveform before mixing into a radio frequency domain for transmittance over an air interface. For example, a semi-static configuration of the uplink baseband signal waveform may be performed via a radio resource control (RRC). However, there may be a need for an alternative configuration solution for uplink baseband signal waveforms, for example, to enhance uplink coverage.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Example embodiments may enable a client device to report an indication of a selected second operation mode to a network device based on a reception of an operation mode switching indication from the network device. A reporting procedure of a changed operation mode of the client device may be determined such that it minimizes impacts on uplink control information (UCI) reporting.

According to a first aspect, a client device is provided. The client device may comprise at least one processor and at least one memory, the at least one memory comprising instructions which, when executed by the at least one processor, cause the client device at least to receive a first indication from a network device comprising at least an indication of a list of at least two operation modes for the client device; receive a second indication from the network device comprising instructions for the client device to select a second operation mode for the client device from the list of at least two operation modes; select the second operation mode, wherein the second operation mode is different than a first operation mode currently in use by the client device; and report an indication of the selected second operation mode to the network device.

According to an example embodiment of the first aspect, the first indication further comprises at least one of a time duration or a period for repeating the time duration, and the at least one memory further comprises instructions which, when executed by the at least one processor, cause the client device to determine an uplink resource for reporting the selected second operation mode based on at least one of the time duration, the period, or the second indication; determine the indication of the selected second operation mode to be reported on the uplink resource; and report the indication of the selected second operation mode to the network device on the determined uplink resource.

According to an example embodiment of the first aspect, the at least one memory comprises instructions which, when executed by the at least one processor, cause the client device to determine a schedule for applying the second operation mode by the client device; and apply the second operation mode for a subsequent uplink transmission to the network device based on the schedule.

According to an example embodiment of the first aspect, the first indication further comprises a second time duration, and the schedule for applying the second operation mode is determined to start at a first uplink symbol or slot after the second time duration from a last symbol or slot of the uplink resource for reporting the second operation mode or a downlink resource for receiving the second indication.

According to an example embodiment of the first aspect, the second indication is received via a downlink control information for uplink data or a downlink control information for downlink data or a medium access control control element, and the at least one memory comprises instructions which, when executed by the at least one processor, cause the client device to determine the uplink resource based on a physical uplink control channel resource of a predefined scheduling request occasion among scheduling request occasions that overlap with the time duration for reporting the selected second operation mode; and report the second operation mode based on the physical uplink control channel of the predefined scheduling request occasion, wherein the selected second operation mode is indicated by applying a cyclic shift on a physical uplink control channel sequence of symbols used on the physical uplink control channel resource, wherein a number of the cyclic shifts and a number of symbols to be shifted for each cyclic shift depends on the number of operation modes in the list of the at least two operation modes.

According to an example embodiment of the first aspect, the second indication is received via a downlink control information for uplink data or a downlink control information for downlink data or a medium access control control element, and the at least one memory comprises instructions which, when executed by the at least one processor, cause the client device to determine the uplink resource based on a physical uplink control channel resource preconfigured by the network device for indicating the selected second operation mode and wherein the physical uplink control channel resource is repeated based on the period; and report the selected second operation mode based on the physical uplink control channel resource preconfigured by the network device for indicating the selected second operation mode.

According to an example embodiment of the first aspect, the second indication is received via a downlink control information for downlink data or a medium access control control element, and the at least one memory comprises instructions which, when executed by the at least one processor, cause the client device to determine the uplink resource based on a physical uplink control channel resource used for transmitting a hybrid automatic repeat request acknowledgement codebook comprising a hybrid automatic repeat request acknowledgement of a corresponding physical downlink shared channel; and report the selected second operation mode by transmitting at least one additional bit indicating the selected second operation mode at an end or at a start of the hybrid automatic repeat request acknowledgement codebook transmitted on the determined physical uplink control channel resource within any of the time durations repeated by the period.

According to an example embodiment of the first aspect, the second indication is received via a downlink control information for downlink data or a medium access control control element, and the at least one memory comprises instructions which, when executed by the at least one processor, cause the client device to determine the uplink resource based on a physical uplink control channel resource used for transmitting a hybrid automatic repeat request acknowledgement codebook comprising a hybrid automatic repeat request acknowledgement of a corresponding physical downlink shared channel; and report the selected second operation mode by transmitting the hybrid automatic repeat request acknowledgement codebook on the determined physical uplink control channel resource by using a physical uplink control channel format, wherein at least a portion of a resource for demodulation reference signal in the physical uplink control channel format is blanked and frequency-shifted for indicating the selected second operation mode.

According to an example embodiment of the first aspect, the list of at least two operation modes for the client device comprises at least one of a cyclic prefix orthogonal frequency division multiplexing, CP-OFDM, waveform, a discrete Fourier transform spread orthogonal frequency division multiplexing, DFT-s-OFDM, waveform, DFT-s-OFDM waveform with or without frequency-domain spectral shaping, FDSS, and spectrum extension, a DFT-s-OFDM waveform with or without tone reservation, or a CP-OFDM waveform with or without tone reservation.

According to a second aspect, a network device is provided. The network device may comprise at least one processor and at least one memory, the at least one memory comprising instructions which, when executed by the at least one memory, cause the network device to send a first indication to a client device comprising at least an indication of a list of at least two operation modes for the client device; send a second indication for the client device comprising instructions to select a second operation mode for the client device from the list of at least two operation modes and to switch to the second operation mode; and receive an indication of the selected second operation mode from the client device.

According to an example embodiment of the second aspect, the first indication further comprises at least one of a time duration or a period for repeating the time duration for receiving the indication of the selected second operation mode on an uplink resource; and wherein the indication is received from the client device on the uplink resource based on at least one of the time duration, the period or the second indication.

According to an example embodiment of the second aspect, the second indication further comprises a second time duration, and the at least one memory further comprises instructions which, when executed by the at least one memory, cause the network device to receive an uplink transmission from the client device according to the selected second operation mode after the received indication based on the second time duration.

According to an example embodiment of the second aspect, the second indication is sent via at least one of a downlink control information or a medium access control control element.

According to an example embodiment of the second aspect, the list of at least two operation modes for the client device comprises at least one of a cyclic prefix orthogonal frequency division multiplexing, CP-OFDM, waveform, a discrete Fourier transform spread orthogonal frequency division multiplexing, DFT-s-OFDM, waveform, DFT-s-OFDM waveform with or without frequency-domain spectral shaping, FDSS, and spectrum extension, a DFT-s-OFDM waveform with or without tone reservation, or a CP-OFDM waveform with or without tone reservation.

According to a third aspect, a method is provided. The method comprises receiving, by a client device, a first indication from a network device comprising at least an indication of a list of at least two operation modes for the client device; receiving, by the client device, a second indication from the network device comprising instructions for the client device to select a second operation mode for the client device from the list of at least two operation modes and to switch to the second operation mode; selecting, by the client device, the second operation mode, wherein the second operation mode is different than a first operation mode currently in use by the client device; and reporting, by the client device, an indication of the selected second operation mode to the network device.

According to an example embodiment of the third aspect, the first indication further comprises at least one of a time duration or a period for repeating the time duration, and the method further comprises determining, by the client device, an uplink resource for reporting the selected second operation mode based on at least one of the time duration, the period, or the second indication; determining, by the client device, the indication of the selected second operation mode to be reported on the uplink resource; and reporting, by the client device, the indication of the selected second operation mode to the network device on the determined uplink resource.

According to an example embodiment of the third aspect, the method comprises determining, by the client device, a schedule for applying the second operation mode by the client device; and applying, by the client device, the second operation mode for a subsequent uplink transmission to the network device based on the schedule.

According to an example embodiment of the third aspect, the first indication further comprises a second time duration, and the schedule for applying the second operation mode is determined to start at a first uplink symbol or slot after the second time duration from a last symbol or slot of the uplink resource for reporting the second operation mode or a downlink resource for receiving the second indication.

According to an example embodiment of the third aspect, the second indication is received via a downlink control information for uplink data or a downlink control information for downlink data or a medium access control control element, and the method comprises determining, by the client device, the uplink resource based on a physical uplink control channel resource of a predefined scheduling request occasion among scheduling request occasions that overlap with the time duration for reporting the selected second operation mode; and reporting, by the client device, the second operation mode based on the physical uplink control channel of the predefined scheduling request occasion, wherein the selected second operation mode is indicated by applying a cyclic shift on a physical uplink control channel sequence of symbols used on the physical uplink control channel resource, wherein a number of the cyclic shifts and a number of symbols to be shifted for each cyclic shift depends on the number of operation modes in the list of the at least two operation modes.

According to an example embodiment of the third aspect, the second indication is received via a downlink control information for uplink data or a downlink control information for downlink data or a medium access control control element, and the method comprises determining, by the client device, the uplink resource based on a physical uplink control channel resource preconfigured by the network device for indicating the selected second operation mode and wherein the physical uplink control channel resource is repeated based on the period; and reporting, by the client device, the selected second operation mode based on the physical uplink control channel resource preconfigured by the network device for indicating the selected second operation mode.

According to an example embodiment of the third aspect, the second indication is received via a downlink control information for downlink data or a medium access control control element, and the method comprises determining, by the client device, the uplink resource based on a physical uplink control channel resource used for transmitting a hybrid automatic repeat request acknowledgement codebook comprising a hybrid automatic repeat request acknowledgement of a corresponding physical downlink shared channel; and reporting, by the client device, the selected second operation mode by transmitting at least one additional bit indicating the selected second operation mode at an end or at a start of the hybrid automatic repeat request acknowledgement codebook transmitted on the determined physical uplink control channel resource within any of the time durations repeated by the period.

According to an example embodiment of the third aspect, the second indication is received via a downlink control information for downlink data or a medium access control control element, and the method comprises determining, by the client device, the uplink resource based on a physical uplink control channel resource used for transmitting a hybrid automatic repeat request acknowledgement codebook comprising a hybrid automatic repeat request acknowledgement of a corresponding physical downlink shared channel; and reporting, by the client device, the selected second operation mode by transmitting the hybrid automatic repeat request acknowledgement codebook on the determined physical uplink control channel resource by using a physical uplink control channel format, wherein at least a portion of a resource for demodulation reference signal in the physical uplink control channel format is blanked and frequency-shifted for indicating the selected second operation mode.

According to an example embodiment of the third aspect, the list of at least two operation modes for the client device comprises at least one of a cyclic prefix orthogonal frequency division multiplexing, CP-OFDM, waveform, a discrete Fourier transform spread orthogonal frequency division multiplexing, DFT-s-OFDM, waveform, DFT-s-OFDM waveform with or without frequency-domain spectral shaping, FDSS, and spectrum extension, a DFT-s-OFDM waveform with or without tone reservation, or a CP-OFDM waveform with or without tone reservation.

According to a fourth aspect, a method is provided. The method comprises sending, by a network device, a first indication to a client device comprising at least an indication of a list of at least two operation modes for the client device; sending, by the network device, a second indication for the client device comprising instructions to select a second operation mode for the client device from the list of at least two operation modes and to switch to the second operation mode; and receiving, by the network device, an indication of the selected second operation mode from the client device.

According to an example embodiment of the fourth aspect, the first indication further comprises at least one of a time duration or a period for repeating the time duration for receiving the indication of the selected second operation mode on an uplink resource; and wherein the indication is received from the client device on the uplink resource based on at least one of the time duration, the period or the second indication.

According to an example embodiment of the fourth aspect, the second indication further comprises a second time duration, and the method comprises receiving, by the network device, an uplink transmission from the client device according to the selected second operation mode after the received indication based on the second time duration.

According to an example embodiment of the fourth aspect, the second indication is sent via at least one of a downlink control information or a medium access control control element.

According to an example embodiment of the fourth aspect, the list of at least two operation modes for the client device comprises at least one of a cyclic prefix orthogonal frequency division multiplexing, CP-OFDM, waveform, a discrete Fourier transform spread orthogonal frequency division multiplexing, DFT-s-OFDM, waveform, DFT-s-OFDM waveform with or without frequency-domain spectral shaping, FDSS, and spectrum extension, a DFT-s-OFDM waveform with or without tone reservation, or a CP-OFDM waveform with or without tone reservation.

According to a fifth aspect, a computer program may be configured, when executed by a processor, to cause an apparatus at least to perform the following: receive a first indication from a network device comprising at least an indication of a list of at least two operation modes for the client device; receive a second indication from the network device comprising instructions for the client device to select a second operation mode for the client device from the list of at least two operation modes; select the second operation mode, wherein the second operation mode is different than a first operation mode currently in use by the client device; and report an indication of the selected second operation mode to the network device. The computer program may further comprise instructions for causing the apparatus to perform any example embodiment of the method of the third aspect.

According to a sixth aspect, an apparatus may comprise means for receiving a first indication from a network device comprising at least an indication of a list of at least two operation modes for the client device; receiving a second indication from the network device comprising instructions for the client device to select a second operation mode for the client device from the list of at least two operation modes; selecting the second operation mode, wherein the second operation mode is different than a first operation mode currently in use by the client device; and reporting an indication of the selected second operation mode to the network device. The apparatus may further comprise means for performing any example embodiment of the method of the third aspect.

According to a seventh aspect, a computer program may comprise instructions for causing an apparatus to perform at least the following: send a first indication to a client device comprising at least an indication of a list of at least two operation modes for the client device; send a second indication for the client device comprising instructions to select a second operation mode for the client device from the list of at least two operation modes and to switch to the second operation mode; and receive an indication of the selected second operation mode from the client device. The computer program may further comprise instructions for causing the apparatus to perform any example embodiment of the method of the fourth aspect.

According to an eighth aspect, an apparatus may comprise means for sending a first indication to a client device comprising at least an indication of a list of at least two operation modes for the client device; sending a second indication for the client device comprising instructions to select a second operation mode for the client device from the list of at least two operation modes and to switch to the second operation mode; and receiving an indication of the selected second operation mode from the client device. The apparatus may further comprise means for performing any example embodiment of the method of the fourth aspect. Many of the attendant features will be more readily appreciated as they become better understood by reference to the following detailed description considered in connection with the accompanying drawings.

BRIEF DESCRIPTION OF THE DRAWINGS

The accompanying drawings, which are included to provide a further understanding of the example embodiments and constitute a part of this specification, illustrate example embodiments and together with the description help to explain the principles of the example embodiments. In the drawings:

FIG. 5 illustrates an example of a message sequence chart between a client device and a network device for acknowledging dynamic switching of operation modes of the client device, according to an example embodiment;

FIG. 8 illustrates an example of a method for a network device according to an example embodiment.

Like references are used to designate like parts in the accompanying drawings.

DETAILED DESCRIPTION

Reference will now be made in detail to example embodiments, examples of which are illustrated in the accompanying drawings. The detailed description provided below in connection with the appended drawings is intended as a description of the present examples and is not intended to represent the only forms in which the present examples may be constructed or utilized. The description sets forth the functions of the example and a possible sequence of operations for constructing and operating the example. However, the same or equivalent functions and sequences may be accomplished by different examples.

Figure 1:
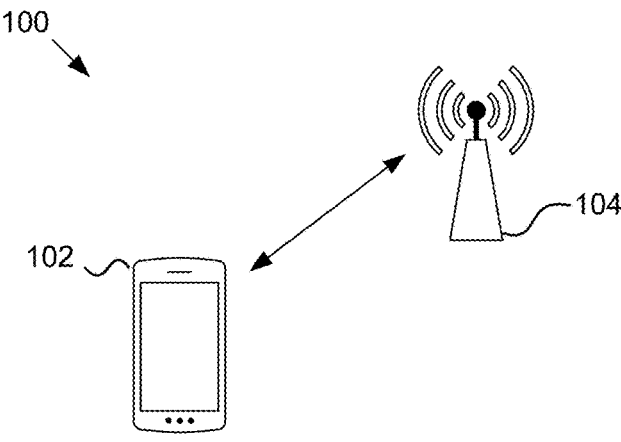
FIG. 1 illustrates an example of a communication network comprising at least one network device and at least one client device according to an example embodiment.

FIG. 1 illustrates an example of a communication network 100 comprising at least one network device 104 and at least one client device 102 according to an example embodiment.

The communication network 100 may be configured for example in accordance with the 5th Generation digital cellular communication network, as defined by the 3rd Generation Partnership Project (3GPP). In one example, the communication network 100 may operate according to 3GPP 5G NR (fifth generation new radio). It is however appreciated that example embodiments presented herein are not limited to this example network and may be applied in any present or future wireless or wired communication networks, or combinations thereof.

The communication network 100 may comprise at least one network device 104. The network device 104 may be also referred to as a network node or a base station, such as a gNB. The communication network 100 may comprise at least one client device, which may be also referred to as a client node, a user node or a UE (user equipment).

The communication network 100 may further comprise one or more core network elements, such as for example access and mobility management function (AMF) and/or user plane function (UPF). The network device and the client device may be configured to communicate with the core network elements over a communication interface, such as for example a control plane interface or a user plane interface. The network devices may be also called a radio access network (RAN) node and they may be part of a radio access network between the core network and the client device. In general, a network device may comprise any suitable radio access point. Although depicted as a single device, a network device may not be a stand-alone device, but for example a distributed computing system coupled to a remote radio head. Various signalling information may be exchanged in the communication network 100 to provide information related to transmission parameters and allocation of radio resources for data transmission. Signalling information may be provided on various levels of a protocol stack.

In wireless networks, such as the communication network 100, modulated symbols and/or reference signals may be converted to a waveform. The waveform may comprise a baseband signal before mixing into a radio frequency domain and transmitted over an air-interface. In 5G NR, two waveforms have been specified. The waveforms include cyclic prefix orthogonal frequency division multiplexing (CP-OFDM), which may be applicable to both uplink and downlink, and discrete Fourier transform spread orthogonal frequency division multiplexing (DFT-s-OFDM), which may be applicable to only uplink.

The DFT-s-OFDM may support a single transmission layer (rank=1) per user. The CP-OFDM may support more than one layer (rank≥1). This means that the CP-OFDM can offer a higher throughput and capacity than the DFT-s-OFDM. In contrast, the DFT-s-OFDM may have a lower peak-to-average power ratio (PAPR) compared to the CP-OFDM. Hence, the DFT-s-OFDM may be used with a higher transmit power. Thus, the DFT-s-OFDM may offer a better coverage.

The DFT-s-OFDM may be generated by adding a transform precoding block before processing blocks used for generating CP-OFDM. The transform precoding block may comprise a fast Fourier transform (FFT) block that converts a time domain signal into frequency domain signal. Due to the transform precoding block used in the transmitter, the waveform may have to be separately configured so that receiver can perform an inverse operation, inverse fast Fourier transformation (IFFT).

5G NR may support semi-static configuration of an uplink waveform via a radio resource control (RRC). Specifically, following rules may be applied for the semi-static configuration. For example, in case transform precoding in PUSCH (physical uplink shared channel) configuration parameters (or configured grant configuration parameters) is enabled, DFT-S-OFDM waveform may be applied for the corresponding PUSCH transmissions. Otherwise, CP-OFDM may be applied. In case transform precoding for Msg3 in RACH (random access channel) configuration parameters is configured, DFT-S-OFDM may be applied for Msg3, or for other PUSCH transmissions that are scheduled with a DCI (downlink control information) format 0_0 used for uplink resource allocation (scheduling grants) for PUSCH. Further, a corresponding PDCCH (physical downlink control channel) may be scrambled by CS-RNTI with NDI=1, C-RNTI, or MCS-CRNTI or SP-CSI-RNTI, or for other PUSCH transmissions that are not scheduled with the DCI format 0_0 in case transform precoding is not configured in PUSCH configuration and the corresponding PDCCH is scrambled by CS-RNTI with NDI=1, C-RNTI, or MCS-CRNTI or SP-CSI-RNTI. Otherwise, CP-OFDM may be applied. CS-RNTI refers to configured scheduling radio network temporary identifier, which is a unique UE identification used for semi-persistent scheduling (SPS) in the downlink and configured grant in the uplink. New data indicator (NDI) may be used to determine if a received transmission block is a transmission of new data or a retransmission of previous data. C-RNTI refers to cell-RNTI, which may be used for transmission to a specific UE after RACH. MSC-CRNTI refers to a modulation coding scheme cell RNTI, which is a unique UE identification used for indicating an alternative MCS table for PDSCH and PUSCH. PDSCH may refer to a physical downlink shared channel. PUSCH may refer to a physical uplink shared channel. SP-CSI-RNTI refers to a semi-persistent channel state information RNTI used to activate/deactivate semi-persistent CSI reporting on PUSCH.

Frequency domain spectrum shaping (FDSS) may be performed with or without spectrum extension. Although DFT-s-OFDM may already offer a lower PAPR compared to the CP-OFDM counterpart of DFT-s-OFDM, in 5G NR a frequency domain spectrum shaping (FDSS) function may be used to further reduce the PAPR. With FDSS, the transmitted signal may be filtered to at least one of obtain a lower PAPR or lower cubic metric (CM). The FDSS may entail further a lower maximum power reduction (MPR), and hence, a higher maximum transmission power to enhance UL (uplink) coverage.

The FDSS may be applied for DFT-s-OFDM without a spectrum extension. For example, the FDSS may be used with pi/2-BPSK (binary phase-shift keying) modulation, wherein two sets of BPSK constellations are shifted by 90°. The gain by applying FDSS to higher order modulation techniques (e.g., quadrature phase-shift keying, QPSK) may be lower than the gain when applying FDSS to pi/2-BPSK. To improve the UL coverage, enhancements for other higher order modulation techniques may be considered. One candidate solution for improvement of the UL coverage comprises symmetric spectrum extension function, which may be introduced before the FDSS in the processing chain. The idea is to extend the spectrum symmetrically by a factor of alpha using an excess band. This spectrum extension may provide several advantages. Firstly, the spectrum extension can reduce the PAPR since effective pulses may have a larger time separation. Secondly, the spectrum extension can reduce inter-symbol interference, which may be added when the FDSS is introduced. Finally, since the excess band comprises data, the excess band may or may not be used by a gNB receiver. In case the excess band is used, it may provide further frequency diversity.

Tone reservation may be used for PAPR reduction. With tone reservation, signals in a subset of available subcarriers may be designed to cancel peaks in the (original) waveform and hence reduce the PAPR of the waveform. These subcarriers may be referred to as peak reduction tones (PRTs). To preserve an error vector magnitude (EVM), there may be no overlap between the PRTs and the subcarriers used for transmitting the data.

A semi-static hybrid automatic repeat request acknowledgement (HARQ-ACK) codebook may be used by a client device, such as a UE, to jointly report HARQ-ACK bits of multiple PDSCHs associated to a same PUCCH resource for HARQ-ACK feedback. PUCCH may refer to a physical uplink control channel. A semi-static HARQ-ACK codebook may be also referred to as Type-1 HARQ-ACK codebook. The number of bits in Type-1 HARQ codebook may be fixed and the mapping of bits to PDSCHs may be done based on at least one of PDSCH-to-HARQ feedback timing values K1, PDSCH TDRA (time domain resource allocation) table, a ratio $2^{(\mu_{DL}-\mu_{UL})}$ between a downlink subcarrier spacing (SCS) configuration $\mu_{DL}$ and an uplink SCS configuration $\mu_{UL}$ if different numerology between DL (downlink) and UL is configured, an indication of a cell specific uplink/downlink time division duplexing (TDD) configuration or a TDD UL/DL dedicated configuration indicating a UE-specific slot configuration.

From the above information, a table that contains possible PDSCH candidates may be determined. Bit-indices of the PDSCH candidates in the HARQ-ACK codebook may be then determined, for example, based on a specific algorithm specified in Clause 9.1.2 of 3GPP TS 38.213 specification. Overall, if none of the PDSCH candidates associated with a bit index in the codebook is received by a client device, the client device may report a bit 0 in the bit index, since the HARQ-ACK codebook size is fixed.

If client device transmits a PUSCH of a smaller priority index scheduled by a DCI format (referred to as LP DG-PUSCH) and a configured grant PUSCH of a larger priority index (referred to as HP CG-PUSCH) on a same serving cell and if the client device is configured to prioritize between LP-DG-PUSCH and HP-CG-PUSCH, the client device may be configured to cancel a repetition of the PUSCH transmissions of smaller priority index (i.e., LP DG-PUSCH) before a first symbol overlapping with the PUSCH transmission of larger priority index (i.e., HP CG-PUSCH) if the repetition of the PUSCH transmissions of smaller priority index overlaps in time with the PUSCH transmissions of larger priority index.

The UL coverage may be enhanced, for example, with following enhancements in power domain. The enhancements in power domain may comprise increasing power high limit of a client device for carrier aggregation (CA) and dual connectivity (DC). The enhancements in power domain may further comprise reducing MPR/PAR, including frequency domain spectrum shaping with and without spectrum extension for DFT-S-OFDM and tone reservation. The enhancements in power domain may further comprise supporting dynamic switching between DFT-S-OFDM and CP-OFDM.

Hence, a solution for UL coverage enhancement may comprise signalling for indication of a switching process from one operation mode of a client device to another operation mode of the client device. The switching process between operation modes for a client device may comprise, for example, at least one of:

a FDSS DFT-s-OFDM with and without spectrum extension, a FDSS DFT-s-OFDM with spectrum extension and with tone reservation, a FDSS DFT-s-OFDM without spectrum extension and with tone reservation, a DFT-s-OFDM with and without tone reservation, a CP-OFDM with and without tone reservation, or DFT-s-OFDM and CP-OFDM waveforms.

According to an example embodiment, a signalling process for dynamic switching between operation modes for a client device may be provided. In dynamic switching, a lower latency may be achieved compared to switching via a RRC reconfiguration. At least for the switching between DFT-s-OFDM and CP-OFDM waveforms, the signalling process may be configured to support dynamic switching of UL waveform based on DCI signalling. The DCI signalling based dynamic waveform switching may comprise explicit signalling, for example, by introducing 1 bit in DCI to indicate a CP-OFDM or a DFT-s-OFDM waveform to be used for PUSCH. Alternatively, the DCI signalling based dynamic waveform switching may comprise implicit signalling, for example, by using a CP-OFDM or a DFT-s-OFDM waveform for PUSCH identified by a certain condition on scheduling information in the DCI without changing a DCI format. The signalling process for dynamic switching of a UL waveform may be also based on MAC CE (medium access control control element) signalling.

The DCI signalling based dynamic switching of UL waveform may offer a higher flexibility as an indication of the switching may be provided using both UL and DL DCI and a lower latency compared to the MAC CE signalling based dynamic UL waveform switching as a MAC CE indication of the switching may require a client device to decode the PDSCH first. A UL DCI may refer to a DCI for scheduling uplink transmission or data. A DL DCI may refer to a DCI for a scheduling downlink transmission or data. However, the DCI signalling based dynamic switching of UL waveform may cause a UL waveform misalignment between a network device and a client device in some scenarios. An UL waveform misalignment between a network device and a client device may mean that there is no common understanding between the network device and the client device on the UL waveform. The DCI used for dynamic switching indication of UL waveform could be either UL DCI or DL DCI. While it may be straightforward that the UL DCI is useful for switching waveform of the PUSCH scheduled by the UL DCI, the DL DCI may be applied for the case when the gNB wants to indicate waveform switching for CG PUSCH.

Figure 2:
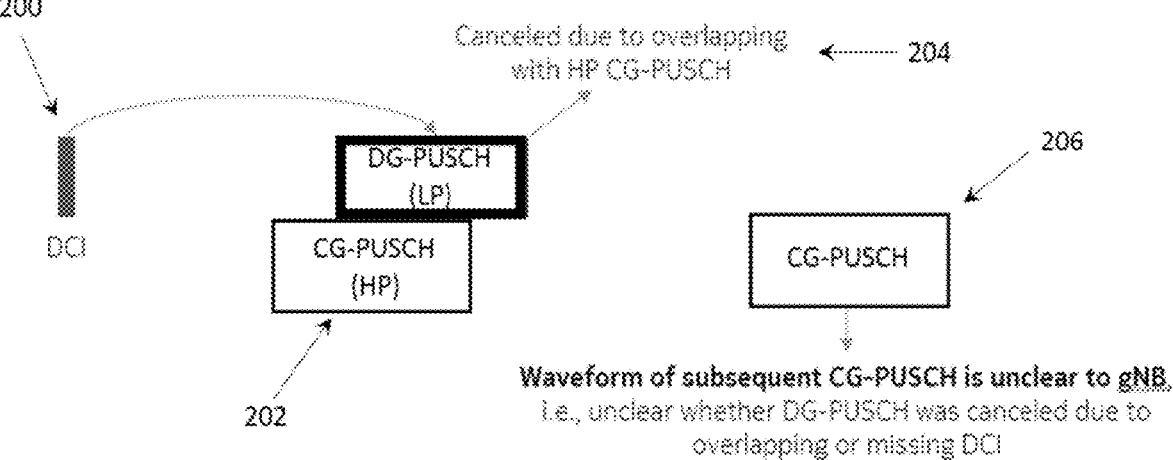
FIG. 2 illustrates an example of potential misalignment on UL waveform when dynamic UL waveform switching is indicated using a UL DCI format.

For the dynamic switching indication for UL waveform using UL DCI, for most of the cases the network device may be able to interpret the UL waveform based on whether the scheduled PUSCH is transmitted by the client device or not. Interpreting the UL waveform may comprise interpreting whether the UL DCI is well received by the client device or not. However, there are a few scenarios wherein misinterpretation may still exist. For example, a case of overlapping between a HP CG-PUSCH and a LP DG-PUSCH as shown FIG. 2 may be considered. It may be observed from FIG. 2 that, since the network device may only receive the HP CG-PUSCH at 202 given that the LP DG-PUSCH (scheduled by the DCI at 200 that indicates the waveform switching) is dropped at 204 due to overlapping with the HP CG-PUSCH, the network device may not know whether the client device has successfully decoded the DCI. Further, the network device may not know whether the client device is changing UL waveform, or whether the DCI has been missed by the client device. Therefore, the network device may not know which waveform will be used by the client device for the subsequence PUSCH at 206.

For the dynamic switching indication of UL waveform using DL DCI and in case HARQ-ACK codebook is used, if the network device receives a NACK (negative acknowledgement) for the bit in the HARQ-ACK codebook that is associated with PDSCH scheduled by the DL DCI, the network device may not know whether the NACK means that the client device failed to decode the PDSCH (but the client device received the DL DCI) or the client device missed the DL DCI. Thus, the UL waveform to be used for the subsequent CG-PUSCH or DG-PUSCH may be unclear to the network device. However, if the HARQ-ACK codebook is not used, then the issue may not exist. In that case, the network device may know that DCI has been received if the client device reports ACK or NACK. Further, the network device may know that DCI has been missed if the client device reports nothing. For example, a DTX (discontinuous transmission) from the client device may be detected by the network device. However, when a Type 1 HARQ-ACK codebook is used, the size of the HARQ-ACK codebook may be fixed. When the size of the HARQ-ACK codebook is fixed, the bit in the HARQ-ACK codebook that is associated with PDSCH scheduled by the DL DCI may always be sent by the client device. The issue of unclear waveform to be used for the subsequent CG-PUSCH or DG-PUSCH may exist also with other HARQ-ACK codebook types used in 5G NR.

The UL waveform misalignment may be unavoidable when a DCI-based dynamic indication is considered for waveform switching. In addition, there may be more than two waveforms which can be used by a client device. Hence, a method to allow the client device to select a waveform that is suitable with a condition or mode of the client device and report the selected waveform may be needed. For example, a client device in power saving mode may not prefer to use waveforms with a spectrum extension. The selection of a suitable waveform may be applicable not only for a DCI-based dynamic waveform switching indication but also for a MAC-CE based dynamic waveform switching indication.

An example embodiment may enable to avoid the issue of waveform misalignment between a network device and a client device. Further, a client device may be enabled to select a more suitable waveform and report the selected waveform to a network device. The client device may be configured to report an acknowledgement to the network device (e.g., gNB), based on a reception of a dynamic switching indication for the operation mode by the client device from the network device. A procedure for reporting by the client device may be designed such that it minimizes impacts on the legacy uplink control information (UCI) reporting.

Figure 3:
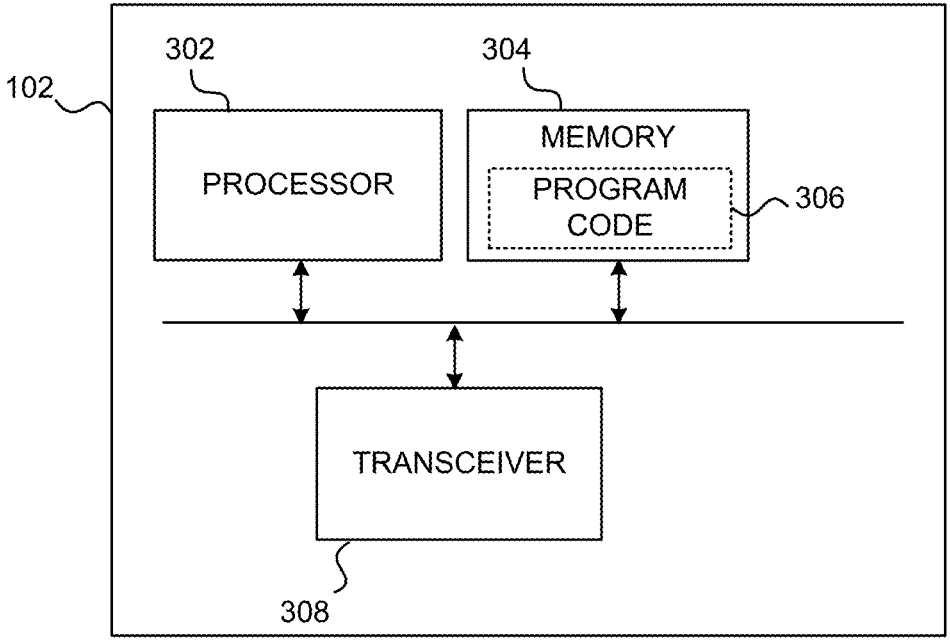
FIG. 3 illustrates an example of a client device configured to practice at least one example embodiment.

FIG. 3 illustrates an example of a client device 102 configured to practice at least one example embodiment. The client device 102 may comprise, for example, a mobile phone, a smart phone, a tablet computer, a smart watch, or any hand-held, portable and/or a wearable device.

The client device 102 may comprise at least one processor 302. The at least one processor 302 may comprise, for example, one or more of various processing devices, such as for example a co-processor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

The client device 102 may further comprise at least one memory 304. The memory 304 may be configured to store, for example, computer program code 306 or the like, for example operating system software and application software. The memory 304 may comprise one or more volatile memory devices, one or more non-volatile memory devices, and/or a combination thereof. For example, the memory 304 may be embodied as magnetic storage devices (such as hard disk drives, magnetic tapes, etc.), optical magnetic storage devices, or semiconductor memories (such as mask ROM, PROM (programmable ROM), EPROM (erasable PROM), flash ROM, RAM (random access memory), etc.).

The client device 102 may further comprise at least one transceiver 308. The transceiver 308 may be configured to enable the client device 102 to transmit information to other devices and to receive information from other devices. For example, the client device 102 may be configured to transmit and/or receive signalling information and data in accordance with at least one cellular communication protocol from/to a network device. The transceiver 308 may be configured to provide at least one wireless radio connection, such as for example a 3GPP mobile broadband connection (e.g., 3G, 4G, 5G). However, the transceiver 308 may be configured to provide one or more other type of connections, for example a wireless local area network (WLAN) connection such as for example standardized by IEEE 802.11 series or Wi-Fi alliance; a short range wireless network connection such as for example a Bluetooth, NFC (near-field communication), or RFID connection; a wired connection such as for example a local area network (LAN) connection, a universal serial bus (USB) connection or an optical network connection, or the like; or a wired Internet connection. The transceiver 308 may comprise, or be configured to be coupled to, at least one antenna to transmit and/or receive radio frequency signals. One or more of the various types of connections may be also implemented as separate communication interfaces, which may be coupled or configured to be coupled to a plurality of antennas.

The client device 102 may further comprise one or more other components not depicted in FIG. 3, such as a user interface comprising an input device and/or an output device.

When the client device 102 is configured to implement some functionality, some component and/or components of the client device 102, such as for example the at least one processor 302 and/or the memory 304, may be configured to implement this functionality. Furthermore, when the at least one processor 302 is configured to implement some functionality, this functionality may be implemented using program code 306 comprised, for example, in the memory 304. For example, the at least one processor 302 may be configured to execute instructions stored on the at least one memory 304, which executed instructions may cause the client device 102 at least to receive a first indication from a network device comprising at least one of a first time duration, a period for repeating the first time duration, an indication of a list of at least two operation modes for the client device or a second time duration; receive a second indication from the network device comprising instructions for the client device to select a second operation mode for the client device from the list of at least two operation modes; select the second operation mode, wherein the second operation mode is different than a first operation mode currently in use by the client device; and report an indication of the selected second operation mode to the network device. The at least one processor 302 may be further configured to execute instructions stored on the at least one memory 304, which executed instructions may cause the client device 102 to determine a procedure for reporting the selected second operation mode based on at least one of the first time duration, the period or the second indication, and to report the selected second operation mode to the network device based on the determined procedure.

The functionality described herein may be performed, at least in part, by one or more computer program product components such as software components. According to an embodiment, the client device 102 comprises a processor or processor circuitry, such as for example a microcontroller, configured by the program code when executed to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), application-specific Integrated Circuits (ASICs), application-specific Standard Products (ASSPs), System-on-a-chip systems (SOCs), Complex Programmable Logic Devices (CPLDs), Graphics Processing Units (GPUs).

The client device 102 comprises means for performing at least one method described herein. In one example, the means comprises the at least one processor 302, the at least one memory 304 including program code 306 configured to, when executed by the at least one processor 302, cause the client device 102 to perform the method. The method may comprise receiving by the client device from a network device (e.g., via RRC) an indication for configurations of at least one of a first time duration, a period for repeating the first time duration, a list of at least two operation modes for the client device, or a second time duration. The method may further comprise receiving, by the client device, from the network device a second indication (e.g., via DL DCI, UL DCI, or MAC-CE) comprising instructions to select a second operation mode for the client device, which is different from a first operation mode currently used by the client device, from the list of at least two operation modes, and switch to the second operation mode. The method may further comprise determining, by the client device, a procedure for reporting the selected second operation mode, wherein the determination may depend at least on the dynamic indication approach and the first time duration, and wherein the procedure includes at least determining by the client device of an UL resource and a technique for reporting the selected second operation mode on the UL resource. The method may comprise reporting, by the client device, the selected second operation mode, for example, by using the determined procedure. The reporting may also work as an acknowledgement for the reception of the dynamic indication by the network device for operation mode switching. The method may further comprise determining, by the client device, a timeline or a schedule for the new, second, operation mode to be applied by the client device, wherein the determination may be based at least on the second time duration and the determined UL resource. The operation mode switching may be used for UL waveform switching by the client device 102.

Figure 4:
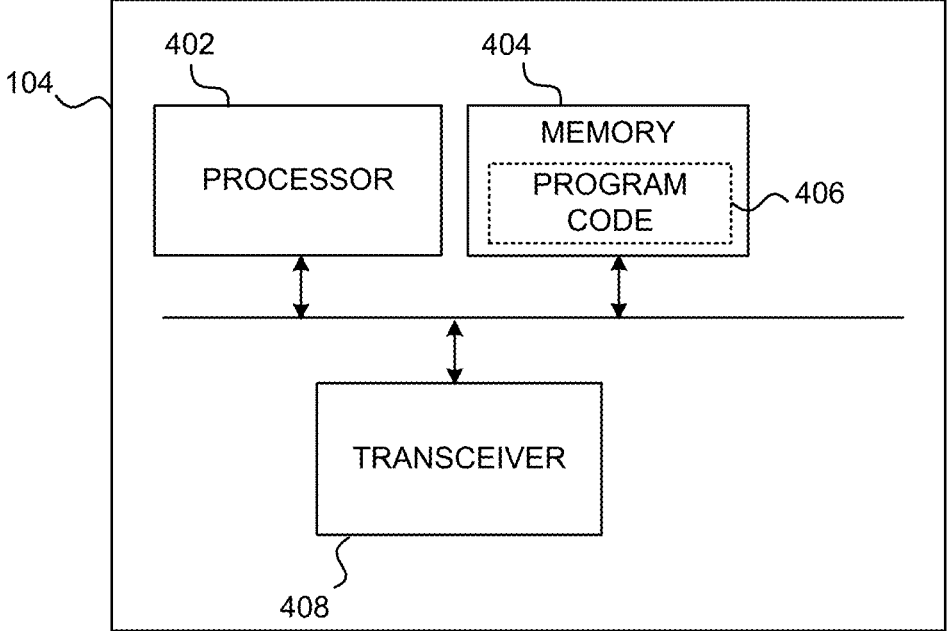
FIG. 4 illustrates an example of a network device configured to practice at least one example embodiment.

FIG. 4 illustrates an example of a network device 104 configured to practice at least one example embodiment. The network device 104 may comprise, for example, a gNB.

The network device 104 may comprise at least one processor 402. The at least one processor 402 may comprise, for example, one or more of various processing devices, such as for example a co-processor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a micro-controller unit (MCU), a hardware accelerator, a special-purpose computer chip, or the like.

The network device 104 may further comprise at least one memory 404. The memory 404 may be configured to store, for example, computer program code 406 or the like, for example operating system software and application software. The memory 404 may comprise one or more volatile memory devices, one or more non-volatile memory devices, and/or a combination thereof. For example, the memory 404 may be embodied as magnetic storage devices (such as hard disk drives, magnetic tapes, etc.), optical magnetic storage devices, or semiconductor memories (such as mask ROM, PROM (programmable ROM), EPROM (erasable PROM), flash ROM, RAM (random access memory), etc.).

The network device 104 may further comprise at least one transceiver 408. The transceiver 408 may be configured to enable the network device 104 to transmit information to other devices and to receive information from other devices. The other devices may comprise, for example, a client device. The transceiver 408 may be configured to provide at least one wireless radio connection, such as for example a 3GPP mobile broadband connection (e.g., 3G, 4G, 5G). However, the transceiver 408 may be configured to provide one or more other type of connections, for example a wireless local area network (WLAN) connection such as for example standardized by IEEE 802.11 series or Wi-Fi alliance; a short range wireless network connection such as for example a Bluetooth, NFC (near-field communication), or RFID connection; a wired connection such as for example a local area network (LAN) connection, a universal serial bus (USB) connection or an optical network connection, or the like; or a wired Internet connection. The transceiver 408 may comprise, or be configured to be coupled to, at least one antenna to transmit and/or receive radio frequency signals. One or more of the various types of connections may be also implemented as separate communication interfaces, which may be coupled or configured to be coupled to a plurality of antennas.

The network device 104 may further comprise one or more other components not depicted in FIG. 4, such as a user interface comprising an input device and/or an output device.

When the network device 104 is configured to implement some functionality, some component and/or components of the network device 104, such as for example the at least one processor 402 and/or the memory 404, may be configured to implement this functionality. Furthermore, when the at least one processor 402 is configured to implement some functionality, this functionality may be implemented using program code 406 comprised, for example, in the memory 404. For example, the at least one processor 402 may be configured to execute instructions stored on the at least one memory 404, which executed instructions may cause the network device 104 at least to send a first indication to a client device comprising at least one of a first time duration, a period for repeating the first time duration, an indication of a list of at least two operation modes for the client device or a second time duration; send a second indication for the client device comprising instructions for the client device to select a second operation mode for the client device from the list of at least two operation modes; and receive an indication of the selected second operation mode from the client device.

The functionality described herein may be performed, at least in part, by one or more computer program product components such as software components. According to an embodiment, the network device 104 comprises a processor or processor circuitry, such as for example a microcontroller, configured by the program code when executed to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), application-specific Integrated Circuits (ASICs), application-specific Standard Products (ASSPs), System-on-a-chip systems (SOCs), Complex Programmable Logic Devices (CPLDs), Graphics Processing Units (GPUs).

The network device 104 comprises means for performing at least one method described herein. In one example, the means comprises the at least one processor 402, the at least one memory 404 including program code 406 configured to, when executed by the at least one processor 402, cause the network device 104 to perform the method. The method may comprise sending by the network device 104 to a client device 102 (e.g., via RRC) an indication for configurations of at least one of a first time duration, a period for repeating the first time duration, a list of at least two operation modes for the client device, and a second time duration. The method may further comprise sending, by the network device 104, to the client device 102 a second indication (e.g., via DL DCI, UL DCI, or MAC-CE) to select a second operation mode, which is different from a first operation mode currently used by the client device, from the list of at least two operation modes, and to switch to the second operation mode. The method may comprise receiving a report from the client device 102, by the network device 104, indicating the selected second operation mode. The report may be received on an uplink received determined by the client device 102 based on at least one of the first time duration, the period or the second indication provided by the network device 104 to the client device 102. The reporting may also work as an acknowledgement for the reception of the dynamic indication by the network device 104 for operation mode switching.

FIG. 5 illustrates an example of a message sequence chart for acknowledging dynamic switching of operation modes for a client device, according to an example embodiment.

Figure 6:
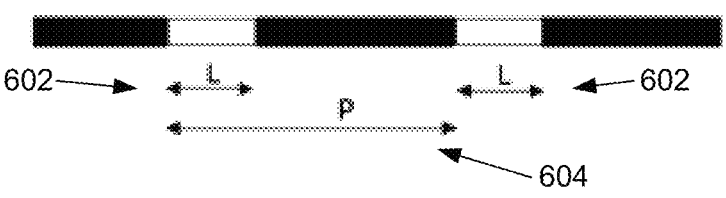
FIG. 6 illustrates an example configuration of a first time duration and a period for repeating the first time duration, according to an example embodiment.

At an operation 500, a network device 104, such as gNB, may be configured to transmit to a client device 102, such as a UE, a first indication. The first indication may comprise at least one of a first time duration or a period for repeating the first time duration. FIG. 6 illustrates an example configuration of a first time duration 602 and a period 604 for repeating the first time duration 602, according to an example embodiment. For example, the first time duration 602 and the period 604 for repeating the time duration may be configured by the network device 102. For example, the first time duration 602 and the period 604 may be configured for configured grant PUSCH. Alternatively, the first time duration 602 and the period 604 may be configured independently, for example, via RRC signaling. In an example, the start of period 604 may comprise a beginning of a first radio frame. Alternatively, the start of period 604 may be configured to reset every cycle of radio frames. Hence, the start of period 604 may be at the beginning of each frame or the beginning of the first radio frame or the beginning of the first radio frame within a cycle of radio frames, such as 10.24 seconds.

At the operation 500, the first indication may further comprise, in addition or alternatively, an indication of a list comprising at least two operation modes for the client device 102. The list may comprise, for example, at least one of a CP-OFDM waveform, a DFT-s-OFDM waveform, the DFT-s-OFDM waveform with FDSS and spectrum extension, the DFT-s-OFDM waveform with FDSS and without spectrum extension, the DFT-s-OFDM waveform with tone reservation, the DFT-s-OFDM waveform without tone reservation, the CP-OFDM waveform with tone reservation, or the CP-OFDM waveform without tone reservation. In an example, the list may comprise at least a CP-OFDM waveform and a DFT-s-OFDM waveform. For example, the first indication may comprise the at least one list comprising at least two operation modes for the client device 102. Alternatively, the first indication may not comprise the at least one list explicitly but instead the client device 102 may be configured to operate in accordance with a list of at least two operation modes for the client device 102 indicated by the first indication. For example, one or a plurality of lists comprising at least two operation modes for the client device 102 may be known by the client device 102 and the first indication may comprise a pointer to one of the lists.

At the operation 500, the first indication may further comprise, in addition or alternatively, a second time duration. The second time duration may be used by the client device for determining a schedule to apply the second operation mode.

At an operation 502, the network device 104 may be configured to transmit a second indication. The second indication may comprise instructions for dynamic switching. The second indication may be transmitted, for example, via at least one of a UL DCI, a DL DCI or a MAC-CE. The second indication may comprise an indication for switching of operation modes (e.g., UL waveform switching) for the client device 102. The second indication may further comprise a trigger for the client device 102 to select and report a second operation mode from the list of at least two operation modes received by the client device 102 at the operation 500. The second operation mode may be different from a first operation mode of the client device 102. The first operation mode may refer to an operation mode which is currently in use by the client device 102.

At an operation 504, the client device 102 may be configured to determine a procedure for reporting the selected second operation mode to the network device 104. Determination of the procedure may be based on the second indication received by the client device 102 at 502. Determination of the procedure may be further based on the first indication. For example, the determination of the procedure may be based on at least one of the first time duration 602 or the period 604. The procedure may comprise determining at least an UL resource for the reporting. The procedure may further comprise determining a technique for reporting the selected second operation mode on the UL resource, i.e., how the selected second operation mode is indicated on the UL resource.

For example, the second indication may not require the client device 102 to report a UCI, for example, when the second indication has been carried out via the UL DCI. Alternatively, the second indication may be carried out via the DL DCI or the MAC-CE. In this case, the client device 102 may be configured to determine a PUCCH resource of a predefined scheduling request (SR) occasion among SR occasions that may overlap within the first time duration 602 for reporting the selected second operation mode. The SR occasions overlapping with the first time duration 602 may occur during any first time duration repeated based on the period 604. In an example, the client device 102 may be configured to determine the PUCCH resource based on a first SR occasion that overlaps with the first time duration 602. Alternatively, the client device 102 may be configured to determine the PUCCH resource based on any SR occasion in every N SR occasions among the SR occasions that overlap with the first time duration 602. In other words, there may be a number of SR occasions within the first time duration 602, and only some of the SR occasions may be available for reporting by the client device 102. For example, every Nth SR occasion may be available for the reporting and every SR occasion between the Nth SR occasions may be available for scheduling requests. For example, when the client device 102 is configured to determine the PUCCH resource based on any Nth SR occasion, the client device 102 may use a later (Nth) SR occasion for the reporting in case the client device 102 needs more processing time. Further, the client device 102 may be configured to apply a cyclic shift on a PUCCH sequence of symbols used on the determined PUCCH resource, wherein the number of cyclic shifts and a number of symbols to be shifted for each cyclic shift may depend on the number of operation modes in the list of at least two operation modes for the client device 102. For example, for a sequence of 12 symbols and a list of 2 operation modes, the client device 102 may be configured to report/acknowledge the second operation mode by cyclic shifts of 0 and 6 symbols. For another example, for a sequence of 12 symbols and a list of 8 operation modes, the client device 102 may be configured to report/acknowledge the second operation mode by cyclic shifts of 0, 1, 3, 4, 6, 7, 9 and 10 symbols.

Alternatively, the client device 102 may be configured to determine the UL resource and the reporting technique based on a PUCCH resource that is preconfigured by the network device 104. The preconfigured PUCCH resource may be dedicated for reporting/acknowledging the selected second operation mode. The client device 102 may be configured to repeat the preconfigured PUCCH resource according to the period 604. In other words, the PUCCH resource may be periodic. In an example, the client device 102 may be configured to apply a time offset to the PUCCH resource. For example, the time offset may be configured by the client device 102 or the network device 104 to start from the PUCCH resource (or from a corresponding PDSCH, in case the indication was received via the DL-DCI or MAC-CE at the operation 502).

In an example, the client device 102 may be configured to report a UCI based on the second indication. This may be the case, for example, when the second indication is carried out via the DL DCI or the MAC-CE at the operation 502. The client device 102 may be configured to determine the UL resource as a PUCCH resource which may be a resource used for transmitting a HARQ-ACK of a corresponding PDSCH. Further, the procedure for reporting the indication of the selected second operation mode may comprise two alternative techniques.

In a first alternative, the client device 102 may be configured to transmit at least one additional bit at the end of a start of a HARQ-ACK codebook. The HARQ-ACK codebook may comprise the HARQ-ACK of the corresponding PDSCH if the HARQ-ACK codebook is transmitted within the first time duration 602. The at least one additional bit may take a value that corresponds to the second operation mode if the client device 102 has received the dynamic switching indication at 502. Alternatively, the at least one additional bit may take a value that corresponds to the current operation mode of the client device 102 if the client device 102 has not received the dynamic switching indication at 502. For example, the client device 102 may have failed to receive the dynamic switching indication at the operation 502.

In a second alternative, the client device 102 may be configured to transmit the HARQ-ACK codebook that comprises the HARQ-ACK of the corresponding PDSCH on the determined PUCCH resource by using a PUCCH format, wherein at least a portion of a resource for demodulated reference signal (DMRS) in the PUCCH format is blanked to be frequency-shifted for indicating the second operation mode. The frequency-shifting may comprise, for example, a half-PRB-shifting.

At an operation 506, the client device 102 may be configured to report an indication of the selected second operation mode to the network device 104 based on the procedure determined by the client device 102 at the operation 504.

At an operation 508, the client device 102 may be configured to schedule the second operation mode to be applied. For example, the second operation mode may be configured to start at a first uplink symbol or slot after the second time duration from a last symbol or slot of the PUCCH resource determined by the client device 102 at the operation 504. Alternatively, the second operation mode may be configured to start at a first uplink symbol or slot after the second time duration from a last symbol or slot of a downlink resource for receiving the second indication by the network device 104.

At an operation 510, the client device 102 may be configured to apply the second operation mode for a subsequent UL transmission following the schedule determined by the client device 102 at the operation 508.

Figure 7:
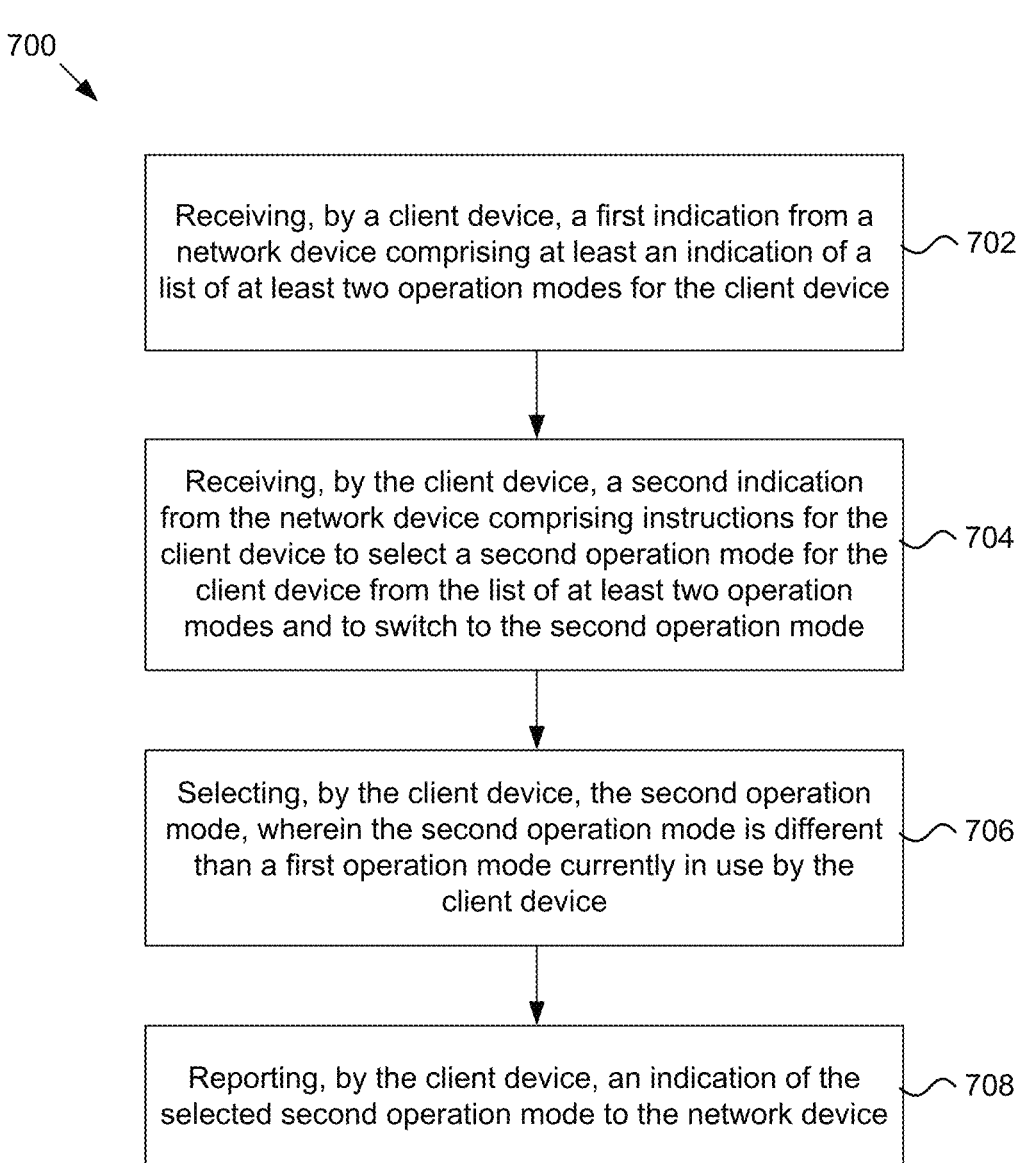
FIG. 7 illustrates an example of a method for a client device according to an example embodiment.

FIG. 7 illustrates an example of a method 700 according to an example embodiment. The method may be performed by a client device, such as the client device 102.

At 702, the method may comprise receiving, by the client device 102, a first indication from a network device comprising at least an indication of a list of at least two operation modes for the client device 102.

At 704, the method may comprise receiving, by the client device 102, a second indication from the network device comprising instructions for the client device 102 to select a second operation mode for the client device 102 from the list of at least two operation modes and to switch to the second operation mode.

At 706, the method may comprise selecting, by the client device 102, the second operation mode, wherein the second operation mode is different than a first operation mode currently in use by the client device 102.

At 708, the method may comprise reporting, by the client device 102, an indication of the selected second operation mode to the network device.

FIG. 8 illustrates an example of a method according to an example embodiment. The method may be performed by a network device, such as the network device 104.

At 802, the method may comprise sending, by the network device 104, a first indication to a client device comprising at least an indication of a list of at least two operation modes for the client device.

At 804, the method may comprise sending, by the network device 104, a second indication for the client device comprising instructions to select a second operation mode for the client device from the list of at least two operation modes and to switch to the second operation mode.

At 806, the method may comprise receiving, by the network device 104, an indication of the selected second operation mode from the client device.

It is obvious to a person skilled in the art that with the advancement of technology, the basic idea of the invention may be implemented in various ways. The invention and its embodiments are thus not limited to the examples described above, instead they may vary within the scope of the claims.

Further features of the methods directly result from the functionalities and parameters of the apparatus as described in the appended claims and throughout the specification and are therefore not repeated here. It is noted that one or more operations of the method may be performed in different order.

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The operations of the methods described herein may be carried out in any suitable order, or simultaneously where appropriate. Additionally, individual blocks may be deleted from any of the methods without departing from the scope of the subject matter described herein. Aspects of any of the embodiments described above may be combined with aspects of any of the other embodiments described to form further embodiments without losing the effect sought.

The term 'comprising' is used herein to mean including the method, blocks, or elements identified, but that such blocks or elements do not comprise an exclusive list and a method or apparatus may contain additional blocks or elements.

As used in this application, the term 'circuitry' may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims.

As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from scope of this specification.

The invention claimed is:

1. A client device comprising at least one processor and at least one memory, the at least one memory comprising instructions which, when executed by the at least one processor, cause the client device at least to:
receive a first indication from a network device comprising at least an indication of a list of at least two operation modes for the client device;
receive a second indication from the network device comprising instructions for the client device to select a second operation mode for the client device from the list of at least two operation modes;
select the second operation mode, wherein the second operation mode is different than a first operation mode currently in use by the client device;
report an indication of the selected second operation mode to the network device;
determine a schedule for applying the second operation mode by the client device; and
apply the second operation mode for a subsequent uplink transmission to the network device based on the schedule;
wherein the first indication further comprises a time duration, and the schedule for applying the second operation mode is determined to start at a first uplink symbol or slot after the time duration from a last symbol or slot of an uplink resource for reporting the second operation mode or a downlink resource for receiving the second indication.

2. The client device of claim 1, wherein the first indication further comprises at least one of an other time duration or a period for repeating the other time duration, and the at least one memory further comprises instructions which, when executed by the at least one processor, cause the client device to:
determine an uplink resource for reporting the selected second operation mode based on at least one of the other time duration, the period, or the second indication;

determine the indication of the selected second operation mode to be reported on the uplink resource; and
report the indication of the selected second operation mode to the network device on the determined uplink resource.

3. The client device of claim 1, wherein the second indication is received via a downlink control information for uplink data or a downlink control information for downlink data or a medium access control control element, and the at least one memory comprises instructions which, when executed by the at least one processor, cause the client device to:
determine the uplink resource based on a physical uplink control channel resource of a predefined scheduling request occasion among scheduling request occasions that overlap with the time duration for reporting the selected second operation mode; and
report the second operation mode based on the physical uplink control channel of the predefined scheduling request occasion, wherein the selected second operation mode is indicated by applying a cyclic shift on a physical uplink control channel sequence of symbols used on the physical uplink control channel resource, wherein a number of the cyclic shifts and a number of symbols to be shifted for each cyclic shift depends on the number of operation modes in the list of the at least two operation modes.

4. The client device of claim 1, wherein the second indication is received via a downlink control information for uplink data or a downlink control information for downlink data or a medium access control control element, and the at least one memory comprises instructions which, when executed by the at least one processor, cause the client device to:
determine the uplink resource based on a physical uplink control channel resource preconfigured by the network device for indicating the selected second operation mode and wherein the physical uplink control channel resource is repeated based on a period for repeating an other time duration; and
report the selected second operation mode based on the physical uplink control channel resource preconfigured by the network device for indicating the selected second operation mode.

5. The client device of claim 1, wherein the second indication is received via a downlink control information for downlink data or a medium access control control element, and the at least one memory comprises instructions which, when executed by the at least one processor, cause the client device to:
determine the uplink resource based on a physical uplink control channel resource used for transmitting a hybrid automatic repeat request acknowledgement codebook comprising a hybrid automatic repeat request acknowledgement of a corresponding physical downlink shared channel; and
report the selected second operation mode by transmitting at least one additional bit indicating the selected second operation mode at an end or at a start of the hybrid automatic repeat request acknowledgement codebook transmitted on the determined physical uplink control channel resource within any of other time durations repeated by a period for repeating the other time duration.

6. The client device of claim 1, wherein the second indication is received via a downlink control information for downlink data or a medium access control control element, and the at least one memory comprises instructions which, when executed by the at least one processor, cause the client device to:

determine the uplink resource based on a physical uplink control channel resource used for transmitting a hybrid automatic repeat request acknowledgement codebook comprising a hybrid automatic repeat request acknowledgement of a corresponding physical downlink shared channel; and report the selected second operation mode by transmitting the hybrid automatic repeat request acknowledgement codebook on the determined physical uplink control channel resource by using a physical uplink control channel format, wherein at least a portion of a resource for demodulation reference signal in the physical uplink control channel format is blanked and frequency-shifted for indicating the selected second operation mode.

7. A network device, the network device comprising at least one processor and at least one memory, the at least one memory comprising instructions which, when executed by the at least one memory, cause the network device to:

send a first indication to a client device comprising at least an indication of a list of at least two operation modes for the client device, wherein the first indication further comprises a time duration;

send a second indication for the client device comprising instructions to select a second operation mode for the client device from the list of at least two operation modes and to switch to the second operation mode;

receive an indication of the selected second operation mode from the client device; and receive an uplink transmission from the client device according to the selected second operation mode and based on a schedule that starts at a first uplink symbol or slot after the time duration from a last symbol or slot of an uplink resource of the client device for reporting the second operation mode or a downlink resource of the client device for receiving the second indication.

8. The network device of claim 7, wherein the first indication further comprises at least one of an other time duration or a period for repeating the other time duration for receiving the indication of the selected second operation mode on an uplink resource; and wherein the indication is received from the client device on the uplink resource based on at least one of the other time duration, the period, or the second indication.

9. The network device of claim 7, wherein the second indication is sent via at least one of a downlink control information or a medium access control control element.

10. The network device of claim 7, wherein the list of at least two operation modes for the client device comprises at least one of:

a cyclic prefix orthogonal frequency division multiplexing waveform, a discrete Fourier transform spread orthogonal frequency division multiplexing waveform, a discrete Fourier transform spread orthogonal frequency division multiplexing waveform with frequency-domain spectral shaping and/or spectrum extension, a discrete Fourier transform spread orthogonal frequency division multiplexing waveform with tone reservation, or a cyclic prefix orthogonal frequency division multiplexing waveform with tone reservation.

11. A method, comprising:

receiving, by a client device, a first indication from a network device comprising at least an indication of a list of at least two operation modes for the client device;

receiving, by the client device, a second indication from the network device comprising instructions for the client device to select a second operation mode for the client device from the list of at least two operation modes and to switch to the second operation mode;

selecting, by the client device, the second operation mode, wherein the second operation mode is different than a first operation mode currently in use by the client device;

reporting, by the client device, an indication of the selected second operation mode to the network device determining, by the client device, a schedule for applying the second operation mode by the client device; and applying by the client device, the second operation mode for a subsequent uplink transmission to the network device based on the schedule;

wherein the first indication further comprises a time duration, and the schedule for applying the second operation mode is determined to start at a first uplink symbol or slot after the time duration from a last symbol or slot of an uplink resource for reporting the second operation mode or a downlink resource for receiving the second indication.

12. The method of claim 11, wherein the first indication further comprises at least one of an other time duration or a period for repeating the other time duration, and the method further comprising determining, by the client device, an uplink resource for reporting the selected second operation mode based on at least one of the other time duration, the period, or the second indication;

determining, by the client device, the indication of the selected second operation mode to be reported on the uplink resource; and reporting, by the client device, the indication of the selected second operation mode to the network device on the determined uplink resource.

13. The method of claim 11, wherein the second indication is received via a downlink control information for uplink data or a downlink control information for downlink data or a medium access control control element, and the method further comprising:

determining, by the client device, the uplink resource based on a physical uplink control channel resource of a predefined scheduling request occasion among scheduling request occasions that overlap with the time duration for reporting the selected second operation mode; and reporting, by the client device, the second operation mode based on the physical uplink control channel of the predefined scheduling request occasion, wherein the selected second operation mode is indicated by applying a cyclic shift on a physical uplink control channel sequence of symbols used on the physical uplink control channel resource, wherein a number of the cyclic shifts and a number of symbols to be shifted for each cyclic shift depends on the number of operation modes in the list of the at least two operation modes.

14. The method of claim 11, wherein the second indication is received via a downlink control information for uplink data or a downlink control information for downlink data or a medium access control control element, and the method further comprising:

determining, by the client device, the uplink resource based on a physical uplink control channel resource preconfigured by the network device for indicating the selected second operation mode and wherein the physical uplink control channel resource is repeated based on the a period for repeating an other time duration; and reporting, by the client device, the selected second operation mode based on the physical uplink control channel resource preconfigured by the network device for indicating the selected second operation mode.

15. The method of claim 11, wherein the second indication is received via a downlink control information for downlink data or a medium access control control element, and the method further comprising:

determining, by the client device, the uplink resource based on a physical uplink control channel resource used for transmitting a hybrid automatic repeat request acknowledgement codebook comprising a hybrid automatic repeat request acknowledgement of a corresponding physical downlink shared channel; and reporting, by the client device, the selected second operation mode by transmitting at least one additional bit indicating the selected second operation mode at an end or at a start of the hybrid automatic repeat request acknowledgement codebook transmitted on the determined physical uplink control channel resource within any of other time durations repeated by a period for repeating the other time duration.

\* \* \* \* \*